2,943,109
PHOTOGRAPHIC DEVELOPERS

David William Crichton Ramsay, Manchester, England, assignor to Imperial Chemical Industries Limited, London, England, a corporation of Great Britain No Drawing. Filed May 14, 1958, Ser. No. 735,100
Claims priority, application Great Britain May 27, 1957
6 Claims. (Cl. 260—501)

This invention relates to photographic developers and more particularly it relates to certain organic salts of photographic developers.

Photographic developers are compounds used for developing an exposed silver halide emulsion to form a silver image. When the development is carried out in the presence of a colour coupler, the oxidation products of the developer which are formed during the development process react with the colour coupler to form a dyestuff image. The photographic developers which are normally used in commercial practice are those substituted or unsubstituted o- or p-aminophenols or p-phenylenediamines which contain one primary or secondary amino group, for example 2:4-diaminophenol, 4-methylaminophenol and N:N-diethyl-p-phenylene diamine. These developers are extremely unstable when kept as the free bases and accordingly they have previously been used in the form of their salts with mineral acids, for example the hydrochlorides.

It has now been found that certain organic salts of photographic developers as hereinafter defined are much more stable to oxygen present in the atmosphere than the corresponding inorganic salts.

According to the invention there are provided the salts of photographic developers which contain at least one amino or substituted amino group, with an acid of the formula X—Ar—SO$_3$H wherein Ar represents an aryl radical and X represents a carboxylic or sulphonic acid group.

Ar is preferably a monocyclic or bicyclic aryl radical and as examples of the aryl residue represented by Ar there may be mentioned benzene, diphenyl and naphthalene and as specific examples of acids of the formula X—Ar—SO$_3$H there may be mentioned naphthalene-1:5-disulphonic acid, diphenyl-4:4'-disulphonic acid, and p-sulphobenzoic acid.

Photographic developers which will form salts with the acid X—Ar—SO$_3$H include 2:4-diaminophenol and 4-methylaminophenol and especially p-phenylene diamines of the formula:

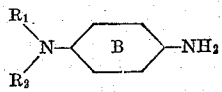

wherein R$_1$ represents a hydrogen atom or a substituted or unsubstituted alkyl, cycloalkyl, aryl or heterocyclic radical, R$_2$ represents a substituted or unsubstituted alkyl, cycloalkyl, aryl or heterocyclic radical or R$_1$ and R$_2$ may be joined together or each or both joined to the benzene ring to form with the nitrogen atom a heterocyclic ring, and the benzene nucleus represented by B may carry substituents.

The groups R$_1$ and R$_2$ may be for example methyl, ethyl, butyl, hydroxyethyl, hydroxybutyl, hydroxypentyl, cyclohexyl, phenyl or 4'-pyridyl. As substituents which may be present in the benzene ring represented by B there may be mentioned alkyl for example methyl or ethyl, substituted alkyl for example hydroxyethyl, alkoxy for example methoxy, ethoxy or β-hydroxyethoxy, amino or substituted amino groups for example methylamino or diethylamino.

According to a further feature of the invention there is provided a process for the manufacture of salts of photographic developers which comprises reacting 1 molecular proportion of a photographic developer which contains at least one amino- or substituted amino group, with 1 molecular proportion of an acid of the formula X—Ar—SO$_3$H where A and X have the meaning stated above.

The process of the invention is conveniently carried out by mixing a solution of the photographic developer in a suitable solvent, for example water or ethanol, with a solution of the acid in a suitable solvent, for example water or ethanol, and if necessary concentrating the mixed solution so obtained until the organic salt of the photographic developer crystallises out.

If desired the organic salt of the photographic developer so obtained may be further purified by recrystallising it from a suitable solvent, for example water and/or ethanol.

The p-phenylene diamines of the above formula may be obtained by treating an aniline which may be substituted in the ortho or meta positions and is also substituted on the nitrogen atom by R$_1$ and R$_2$ where R$_1$ and R$_2$ have the meaning stated above, with nitrous acid and subsequently treating the nitroso compound so formed with a reducing agent.

As examples of substituted anilines which may be used there may be mentioned N-ethyl-N-(deltahydroxybutyl)-m-toluidine, N:N-bis-(gammahydroxypropyl)-aniline, N:N-bis(epsilonhydroxypentyl)-aniline, 1-ethyl-1:2:3:4-tetrahydroquinoline, and N-phenyl pyrrolidine.

The organic salts of the photographic developers are of particular value in cases where the developers in the form of the free bases are difficult to purify, as the organic salts of such photographic developers can often be readily purified by crystallisation from a suitable solvent.

The organic salts of the photographic developers as hereinbefore defined may be incorporated in a developing solution which is to be used for developing an exposed light-sensitive photographic material or they may be incorporated in a light-sensitive photographic material and such a material, after exposure to light treated in an aqueous solution of an alkali, for example sodium carbonate or potassium carbonate, to effect development.

The invention is illustrated but not limited by the following examples in which the parts and percentages are by weight:

Example 1

A solution of 100 parts of sodium nitrite in 276 parts of water is added with stirring to a solution of 286 parts of N-ethyl-N-(deltahydroxybutyl)-m-toluidine in a mixture of 310 parts of a concentrated aqueous solution of hydrochloric acid and 415 parts of water which is stirred at between 0° and 5° C. The mixture so obtained is then stirred for 1 hour, 224 parts of a 32% aqueous solution of caustic soda are added and then a solution of 55 parts of sulphur and 412 parts of sodium sulphide in 386 parts of water is added during 30 minutes. The mixture is stirred at between 95° and 100° C. for 1½ hours, cooled and extracted with 720 parts of chloroform. The chloroform extracts are washed three times with 138 parts of a 10% aqueous solution of sodium chloride and the chloroform is then distilled off under a slightly reduced pressure. The residual crude 4-amino-3-methyl-N-ethyl-N-(deltahydroxybutyl)-aniline, is dissolved in 785 parts of ethanol and the solution added with stirring to a solution of 400 parts of naphthalene-1:5-disulphonic acid in 3550 parts of ethanol. The mixture is stirred for 3 hours and the solid product which separates out is filtered off and washed with 110 parts of ethanol. The naphthalene-1:5-disulphonic acid salt of 4-amino-3-methyl-N-ethyl-N-(deltahydroxybutyl)-aniline crystallises from a mixture of 410 parts of water and 140 parts of ethanol in the form of colourless prisms which melt at 257°–258° C. with decomposition. On analysis the product is found to contain 54.0% of carbon, 5.5% of hydrogen and 12.5% of sulphur. ($C_{13}H_{22}ON_2.C_{10}H_8O_6S_2$ requires 54.1% of carbon, 5.9% of hydrogen and 12.5% of sulphur.)

*Example 2*

In place of the 286 parts of N-ethyl-N-(deltahydroxybutyl)-m-toluidine used in Example 1 there are used 206 parts of N:N-diethylaniline. The 1:5-naphthalenedisulphonic acid salt of 4-amino-N:N-diethylaniline is obtained in the form of colourless needles which melt at 298° C. with decomposition.

*Example 3*

To a solution of 5 parts of 2:4-dinitrophenol in 84 parts of ethanol there is added 1 part of a Raney nickel catalyst. The mixture is stirred at 60° C. for 3 hours in an autoclave in the presence of hydrogen at a pressure of 30 atmospheres. The mixture so obtained is filtered and the filtrates are added to a solution of 9 parts of naphthalene-1:5-disulphonic acid in 90 parts of ethanol. The solid so obtained is filtered off and crystallised from water. The naphthalene 1:5-disulphonic acid salt of 2:4-diaminophenol is obtained in the form of colourless prisms which do not melt below 320° C. On analysis the product is found to contain 46.2% of carbon, 3.9% of hydrogen, 6.8% of nitrogen and 15.3% of sulphur ($C_6H_8ON_2.C_{10}H_8O_6S_2$ requires 46.6% of carbon, 3.9% of hydrogen, 6.8% of nitrogen and 15.5% of sulphur).

A solution of 100 parts of p-sulphobenzoic acid and 55 parts of p-aminophenol in 2,500 parts of glacial acetic acid is heated under reflux for 3 hours. The reaction mixture is cooled to room temperature and the solid product is filtered off. The p-sulphobenzoic acid salt of p-aminophenol thus obtained crystallises from water in the form of pale yellow needles which melt at 276° C. with decomposition. On analysis the product is found to contain 49.7% of carbon and 4.0% of hydrogen ($C_6H_7ON.C_7H_6O_5S$ requires 50.2% of carbon and 4.2% of hydrogen).

*Example 5*

In place of the 55 parts of p-aminophenol used in Example 4 there are used 61 parts of p-methylaminophenol. The p-sulphobenzoic acid salt of p-methylaminophenol is obtained in the form of pale yellow prisms which melt at 246° C. with decomposition. On analysis the product is found to contain 52.3% of carbon, 4.9% of hydrogen and 4.3% of nitrogen. ($C_7H_9ON.C_7H_6O_5S$ requires 51.7% of carbon, 4.6% of hydrogen and 4.3% of nitrogen).

*Example 6*

To a stirred solution of 55 parts of p-aminodiethylaniline in 800 parts of ethanol a solution of 100 parts of diphenyl-4:4'-disulphonic acid in 800 parts of ethanol is added at 0° C. The mixture is stirred for 3 hours and the solid product which separates out is filtered off. It is the diphenyl-4:4'-disulphonic acid salt of p-aminodiethylaniline and can be crystallised from a mixture of 300 parts of water and 1500 parts of ethanol in the form of colourless needles which melt at 292° C. with decomposition. On analysis the product is found to contain 53.6% of carbon, 5.9% of hydrogen and 12.7% of sulphur. ($C_{10}H_{16}N_2.C_{12}H_{10}O_6S_2.½H_2O$ requires 54.2% of carbon, 5.5% of hydrogen and 13.1% of sulphur.)

*Example 7*

To a solution of 5 parts of N-(4-aminophenyl)hexamethyleneimine in 100 parts of ethanol a solution of 7.7 parts of naphthalene-1:5-disulphonic acid in 100 parts of ethanol is added. The solid so obtained is filtered off and crystallised from water. The naphthalene 1:5-disulphonic acid salt of N-(4-aminophenyl)-hexamethyleneimine is obtained in the form of colourless needles which do not melt below 320° C. On analysis the product is found to contain 55.2% of carbon, 6.0% of hydrogen and 5.8% of nitrogen ($C_{12}H_{18}N_2.C_{10}H_8O_6S_2$ requires 55.2% of carbon, 5.5% of hydrogen and 5.9% of nitrogen).

*Example 8*

To a solution of 7 parts of 6-(2':5'-dichlorobenzeneazo) - 1 - β-hydroxyethyl-1:2:3:4-tetrahydro-quinoline in 100 parts of ethanol there is added 1 part of a Raney nickel catalyst. The mixture is stirred at 70° C. for 3 hours in an autoclave in the presence of hydrogen at a pressure of 30 atmospheres. The mixture so obtained is filtered and the filtrates are added to a solution of 7.6 parts of naphthalene-1:5-disulphonic acid in 100 parts of ethanol. The solid so obtained is filtered off and crystallised from aqueous ethanol. The naphthalene-1:5-disulphonic acid salt of 6-amino-1-β-hydroxyethyl-1:2:3:4-tetra-hydroquinoline is thus obtained in the form of fawn needles which melt at 262–264° C. with decomposition. On analysis the product is found to contain 50.4% of carbon, 5.3% of hydrogen and 5.5% of nitrogen. ($C_{11}H_{16}ON_2.C_{10}H_8O_6S_2.H_2O$ requires 50.6% of carbon, 5.2% of hydrogen and 5.6% of nitrogen.)

*Example 9*

In place of the 286 parts of N-ethyl-N-(deltahydroxybutyl)-m-toluidine used in Example 1 there are used 420 parts of N-di-(epsilon-hydroxypentyl)-m-anisidine. The 1:5-naphthalene-disulphonic acid salt of 4-amino-3-methoxy-N-di-(epsilonhydroxypentyl)-aniline is obtained in the form of colourless prisms which melt at 230–231° C. with decomposition. On analysis the product is found to contain 52.4% of carbon, 6.7% of hydrogen, 4.7% of nitrogen and 9.9% of sulphur.

$$(C_{17}H_{30}O_3N_2.C_{10}H_8O_6S_2.H_2O)$$

requires 52.6% of carbon, 6.5% of hydrogen, 4.6% of nitrogen and 10.4% of sulphur.)

What I claim is:

1. The salts of photographic developers selected from the group consisting of o-amino phenol, p-aminophenol and p-phenylene diamines having the formula

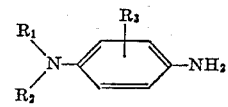

in which $R_1$ is selected from the group consisting of the hydrogen atom and lower alkyl, cycloalkyl, phenyl, 4'-pyridyl and hydroxy-lower alkyl radicals, $R_2$ is selected from the group consisting of lower alkyl, cycloalkyl, phenyl, 4'-pyridyl and hydroxy-lower alkyl radicals and $R_3$ is selected from the group consisting of hydrogen, lower alkyl groups, lower alkyloxy groups and lower alkyl amino groups, with an acid having the formula X—Ar—$SO_3H$ wherein Ar represents an aryl radical and X is selected from the class consisting of carboxylic and sulfonic acid groups.

2. Salts according to claim 1 wherein the aryl radical represented by Ar is selected from the group consisting of mono- and bicyclic aryl radicals.

3. Salts according to claim 1 wherein the acid is p-sulphobenzoic acid.

4. Salts according to claim 1, wherein the acid is naphthalene-1:5-disulphonic acid.

5. Salts according to claim 1 wherein the acid is diphenyl-4:4'-disulphonic acid.

6. The naphthalene-1:5-disulphonic acid salt of 4-amino-3-methyl-N-ethyl-N-(deltahydroxybutyl)-aniline.

No references cited.